United States Patent [19]

Berthel et al.

[11] Patent Number: 5,191,543

[45] Date of Patent: Mar. 2, 1993

[54] ELECTRONIC BALANCE WITH CALIBRATING DEVICE

[75] Inventors: Dieter Berthel, Göttingen; Franz-Josef Melcher, Hardegsen, both of Fed. Rep. of Germany

[73] Assignee: Sartorius AG, Göttingen, Fed. Rep. of Germany

[21] Appl. No.: 599,838

[22] Filed: Oct. 19, 1990

[30] Foreign Application Priority Data

Oct. 21, 1989 [DE] Fed. Rep. of Germany ....... 3935118

[51] Int. Cl.$^5$ ............................................. G01G 19/52
[52] U.S. Cl. ..................................... 364/567; 177/50; 364/556; 364/571.01
[58] Field of Search ........... 364/567, 466, 550, 551.01, 364/552, 556, 571.01, 571.02, 571.05; 177/164, 50

[56] References Cited

U.S. PATENT DOCUMENTS 4,660,663  4/1987  Amacher et al. ...................... 177/50
4,723,613  2/1988  Garlen et al. .................... 177/164 X Primary Examiner—Parshotam S. Lall
Assistant Examiner—Edward Pipala
Attorney, Agent, or Firm—Eric P. Schellin

[57] ABSTRACT

An electronic balance with a measured value receiver, a digital signal processing unit, a display unit and a calibrating device controlled by the digital signal processing unit (18) for placing on and lifting off a calibrating weight by use of a motor that the digital signal processing unit allows the calibrating weight to be continuously placed on and lifted off again and calculates the average value and the standard deviation from the individual measured values. Then compares the calculated standard deviation continuously with a set value stored in the digital signal processing unit and stops the placing on and the lifting off of the calibrating weight and calculates the calibrating factor from the calculated average value and stores the factor as soon as the calculated standard deviation is smaller than the set value and that the digital signal processing unit also stops the placing on the lifting off of the calibrating weight after a set maximum time if the calculated standard deviation is not smaller than the set value and does not store a new calibrating factor in this instance.

4 Claims, 3 Drawing Sheets

ELECTRONIC BALANCE WITH CALIBRATING DEVICE

BACKGROUND OF THE INVENTION

The invention relates to an electronic balance with a measured value receiver, a digital signal processing unit, a display unit and a calibrating device controlled by the digital signal processing unit for placing on and lifting off a calibrating weight by means of a motor.

Balances of this type are known e.g. from EP 0 93 183 (B1). This publication suggests that in order to assure a correction calibration, the result of a calibrating cycle be subjected to a plausibility test and that the balance be freed only upon a positive result of this test. It indicates as an example of a plausibility test that the calibrating cycle be performed repeatedly and that the results be checked for uniformity. In such circumstances, no data is furnished about the number of repetitions. However, the exact uniformity of two calibrating cycles can only be assured in the case of balances with a low and average resolution. Another disadvantage is the fact that the balance is no longer freed upon a negative outcome of the plausibility test, that is, no more weighings are possible.

The calculating of the average value and the standard deviation from several weighing results is also generally known (e.g. DE-OS 23 20 612).

The invention therefore has the problem of indicating an electronic balance of the initially mentioned type in which a reliable and exact calibration is possible, even in the case of a high resolution, in which the time required for the calibration is reduced to the minimum necessary and false calibrations are nevertheless largely excluded and which can be flexibly adapted to various customer requests and ambient conditions.

SUMMARY OF THE INVENTION

The invention solves this problem in that the digital signal processing unit allows the calibrating weight to be continuously placed on and lifted off again and calculates the average value and the standard deviation from the individual measured values, compares the calculated standard deviation continuously with a set value stored in the digital signal processing unit and stops the placing on and the lifting off of the calibrating weight and calculates the calibrating factor from the calculated average value and stores it as soon as the calculated standard deviation is smaller than the set value and that the digital signal processing unit also stops the placing on and the lifting off of the calibrating weight after a set maximum time if the calculated standard deviation is not smaller than the set value and does not store a new calibrating factor in this instance.

How exact the new calibration will be under the particular prevailing ambient conditions is quantitatively known from the multiple repetition of the placing on and the lifting off of the calibrating weight and from the calculation of the standard deviation. Based on this information, the digital signal processing unit can automatically decide, using the set minimum requirements, whether a new calibrating factor should be stored, based on this calibrating measurement, or whether the old calibrating factor should continue to be used. In addition, the continuous repetition of the placing on the lifting off of the calibrating weight in accordance with the invention offers the advantage that the standard deviation of the average value becomes smaller as the number of measured values becomes greater, so that the calibration can be carried out with a greater precision than the individual measurement. This is especially important in balances with a high resolution (100,000 increments and more). On the other hand, an unnecessarily high number of repetitions of the placing on and the lifting off of the calibrating weight is avoided and the calibration is terminated immediately after the attainment of the set minimum requirement. In contrast thereto, in the case of a set number of repetitions, the most unfavorable ambient conditions must be taken as a starting point and the number of repetitions must accordingly be set very high. As a result, only a minimum amount of time is required for the calibration. When the minimum requirement is set, which can take place e.g. within the framework of a menu, the operator can additionally decide whether he places more value on a high exactitude or on a low time requirement for calibrating and can set the minimum requirement accordingly.

BRIEF DESCRIPTION OF THE DRAWINGS

The invention is described in the following with reference made to the schematic figures.

DETAILED DESCRIPTION OF THE INVENTION

Figure 1:
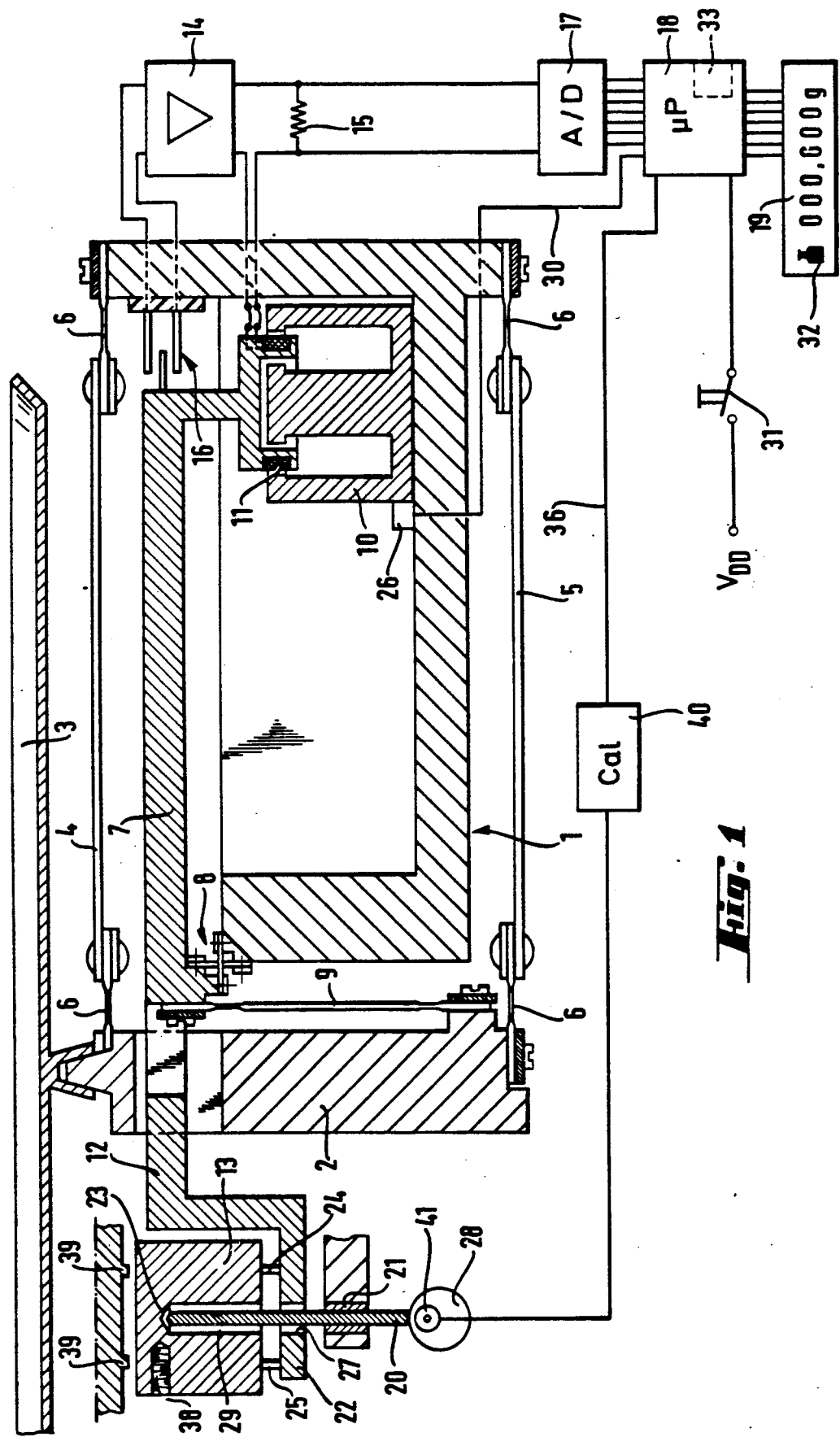
FIG. 1 shows a section through the weighing system and a block diagram of the electronic circuitry in a first embodiment.

FIG. 1 shows a section through the weighing system and a block diagram of the associated electronic circuitry. The balance housing and the voltage supply of the electronic circuitry are omitted for the sake of simplicity since they are not essential for an understanding of the invention. The weighing system consists of a system carrier 1 fixed to the housing to which carrier a load receiver 2 is fastened in a vertically movable direction via two guide rods 4, 5 with articulations 6. Load receiver 2 carries load scale 3 in its upper part for receiving the material to be weighed and transfers the force corresponding to the mass of the material to be weighed via coupling element 9 to the load arm of translation lever 7. Translation lever 7 is mounted by cross spring joint 8 on system carrier 1. A coil shell with coil 11 is fastened to the compensation arm of translation lever 7. Coil 11 is located in the air gap of permanent magnet system 10 and generates the compensating force. The magnitude of the compensation current through coil 11 is regulated thereby in a known manner by position sensor 16 and automatic gain control amplifier 14 in such a manner that equilibrium prevails between the weight of the material to be weighed and the electromagnetically generated compensating force. The compensation current generates a measuring voltage on measuring resistor 15 which is supplied to analog-to-digital converter 17. The digitized result is taken over by digital signal processing unit 18 and digitally displayed in display 19. Temperature sensor 26 is also present, which transforms the temperature of the measured value receiver into a digital signal and supplies it via lead 30 to digital signal processing unit 18. Digital signal processing unit 18 can correct temperature errors of the measured value receiver therewith.

The load arm of translation lever 7 is extended past the fastening point of coupling element 9 and terminates in a downwardly offset part 22. Three vertically standing centering pins are fastened to part 22 of which only the two centering pins 24, 25 can be recognized in FIG. 1. These centering pins carry calibrating weight 13. Calibrating weight 13 comprises a bore 29 coming from below which terminates in a conical area 23. This bore passes precisely through the center of gravity of the calibrating weight so that the conical area is located vertically over the center of gravity of the calibrating weight.

Moreover, a lifting device for the calibrating weight is indicated in FIG. 1 which consists of a prong 20 guided in a vertically movable fashion in casing 21 fixed to the housing. The device for moving the prong is indicated only by eccentric 28 and electromotor 41. Prong 20 extends through aperture 27 in part 22 into bore 29 in calibrating weight 13. In the positions shown, in which the calibrating weight rests on the centering pins and thus on translation lever 7/12/22, prong 20 ends with its conical tip closely underneath conical area 23. If prong 20 is now raised by eccentric 28, it makes contact with conical area 23, lifts calibrating weight 13 off of the translation lever and presses it against stops 39 fixed to the housing. This is the normal position of the calibrating weight (weighing position) whereas the lowered position shown in FIG. 1 is assumed only for the calibrating process. The center of gravity of calibrating weight 13 can be shifted slightly by means of screw 28, which can produce a fine compensation.

The drive of electromotor 41 takes place by means of sequencing control 40, which is connected for its part to digital signal processing unit 18 via lead 36. Sequencing control 40 starts electromotor 41, waits after the placing of calibrating weight 13 on translation lever 7/12/22 until digital signal processing unit 18 announces the stabilizing of the measured value and then allows electromotor 41 to lift calibrating weight 13 back into the weighing position. Sequencing control 40 repeats this cycle as long as it receives the command for this from digital signal processing unit 18.

Digital signal processing unit 18 now calculates the difference of the measured values when calibrating weight 13 is placed on and when it is lifted off and calculates the average value and the standard deviation from the successive cycles. This calculated standard deviation is now compared with a value stored in memory area 33 of digital signal processing unit 18. As long as the calculated standard deviation is greater than the stored value, sequencing control 40 receives the command to continue to place and to lift off calibrating weight 13. Only when the calculated standard deviation is less than or equal to the stored value does the sequencing control receiving the stop command and the new calibrating factor is calculated from the average value of all measurements and stored. If the calculated standard deviation should still be above the value set in memory area 33 even after a set maximum time or after a set maximum number of the placing-on/lifting-off cycles, then the digital signal processing unit nevertheless gives the stop command for sequencing control 40 but does not store any new calibrating factor in this instance but rather continues to use the old calibrating factor; the calibrating measurement is therefore rejected in this instance.

These measures have the effect on the one hand that the number of repetitions of the placing-on/lifting-off cycle is kept as low as possible in order to maintain the set calibrating exactitude. On the other hand, it is prevented that a calibrating factor which was determined only imprecisely is stored inadvertently if, for example, the balance is disturbed during the calibrating process by vibrations, drafts of air or the like. In addition, a greater exactitude during calibration is possible by means of the multiple repetition of the placing-on/lifting-off cycle since the uncertainty—expressed by the standard deviation— is less in the case of an average value of several measurements than in the case of an individual measurement.

The start of the calibrating process can take place e.g. by means of an actuation of key 31. During the calibrating process, symbol 32 will light up in display 19 and disappear again upon a successful conclusion. If the calibration should end without the storing of a new calibrating factor, symbol 32 will e.g. continue to blink subsequently for a while. However, the calibrating process can also be started automatically by digital signal processing unit 18, e.g. when the temperature has changed since the last calibration by more than a set value. If the calibration which is then actually necessary should end on account of too great a standard deviation without the storing of a new calibrating factor, then in this instance the operator will be made aware of the necessary calibration in this instance by a continuous blinking of symbol 32. However, the balance remains operational in any case since even in the case of a negative conclusion of the calibrating process the balance is not blocked but rather the previous calibrating factor continues to be used.

The calculated average value of the placing-on/lifting-off cycles can of course also be considered when deciding whether a new calibrating factor should be stored or not. If the difference between the previous calibrating factor and the newly calculated calibrating factor is less than the standard deviation, the previous calibrating factor can continue to be used and the storage of a new calibrating factor does not occur. Conversely, a new calibrating factor can also be stored when the calculated standard deviation is greater than the set value if, namely, the difference between the newly calculated calibrating factor and the previous calibrating factor is e.g. greater than the triple value of the standard deviation.

Figure 2:
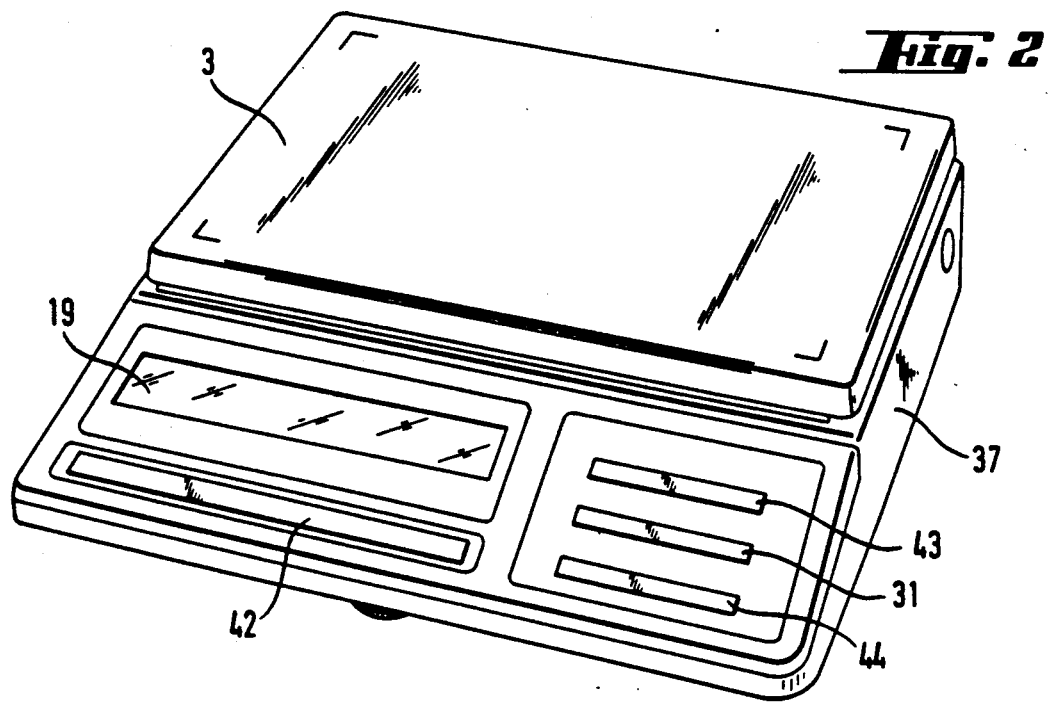
FIG. 2 shows the outside of the balance in a perspective view.

FIG. 2 shows the outside of the balance in a perspective view. Housing 37 surrounds the weighing system shown in FIG. 1 and balance scale 3 forms the upper closure of the housing. Display unit 19 is located in front of balance scale 3. Operating keys 31 for starting the calibrating process and other operating keys 42, 43 and 44 for other customary operating functions such as e.g. taring are located in front of and adjacent to display unit 19.

Figure 3:
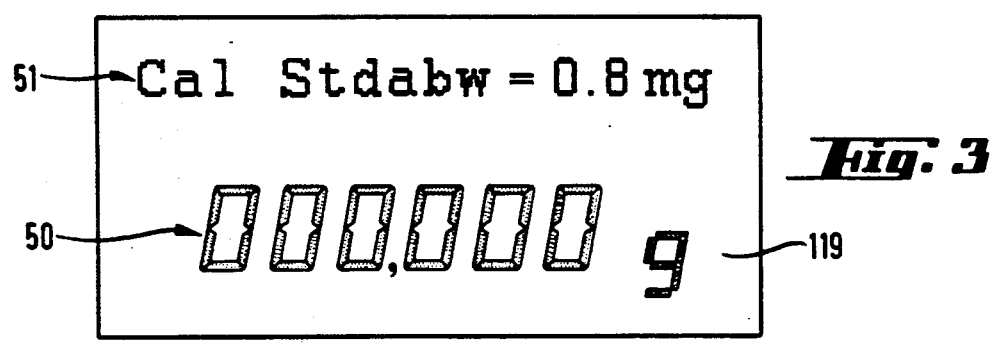
FIG. 3 shows the display unit of a second embodiment.

FIG. 3 shows the display unit 119 of a second embodiment of the balance. The mechanical and electronic part of the balance is otherwise identical to the first embodiment shown in FIG. 1. A display field 51 is provided in FIG. 3 above display 50 for the weighing result in which field 51 various information can be transmitted to the user via alphanumeric symbols. During the calibrating process, the abbreviation "Cal" is displayed first and then, as soon as the calibrating weight has been placed on and lifted off again twice, the calculated standard deviation. The operator will then decide whether the standard deviation already meets his/her requirements for exactitude—he/she then presses the operating key provided for this purpose (e.g. key 43 in FIG. 2) and prematurely terminates the calibrating process therewith and allows the calculated calibrating factor to be stored—or whether he/she will allow the placing on and the lifting off of the calibrating weight to continue to proceed in order to obtain a smaller standard deviation. Since the operator receives a new actualized value for the standard deviation displayed after each placing-on/lifting-off of the calibration weight, he/she can also recognize how the standard deviation changes in each instance and whether it is worth the expense to continue to wait. The balance advantagaeously comprises two operating keys which are active during the calibrating process: During the actuation of the one operating key the calibrating process is concluded with the storing of a new calibrating factor and during the actuation of the other operating key the calibrating process is concluded without the storing of a new calibrating process. This makes it possible for the operator to either conclude the calibrating process and store the calibrated factor if the achieved exactitude of the calibration suffices for him/her at the moment; or, he can break off the calibrating process if he/she determines that no calibration with the desired exactitude is possible due to the instantaneous ambient conditions (e.g. vibrations); in this instance the previous calibrating factor remains stored and continues to be used. In this embodiment the operator can therefore vary the automatic course of the calibrating process in accordance with instantaneous goals. He/she can e.g. also extend the calibrating process by means of continuously pressing on start key 31 in order to achieve in this manner a calibrating exactitude for the particular weighings currently to be performed which is higher than otherwise customary.

The operating keys can receive an "inscription" of their instantaneous function in the right part of display 119. This inscription is controlled thereby by the digital signal processing unit in such a manner that the keys can have a different function during calibration than e.g. during weighing. In addition, it is known from DE-OS 36 38 210 that operating keys can be divided into several partial areas. It is readily possible by means of one of these known measures to use several operating keys for the calibrating process without increasing the total number of operating keys of the balance.

Figure 4:
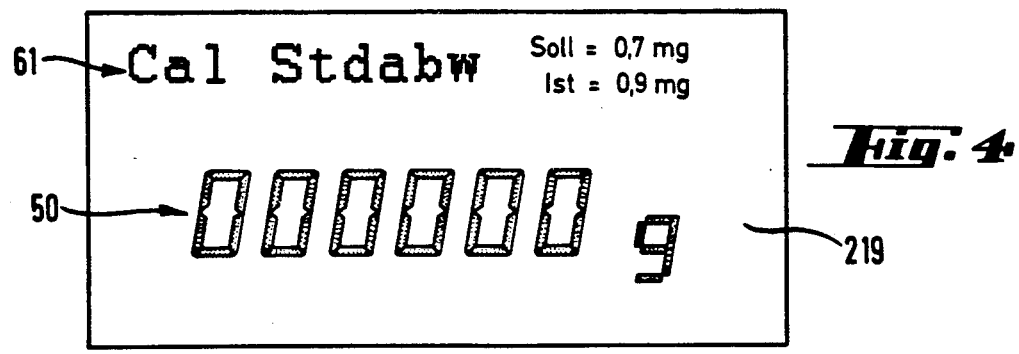
FIG. 4 shows the display unit of a third embodiment.
Figure 5:
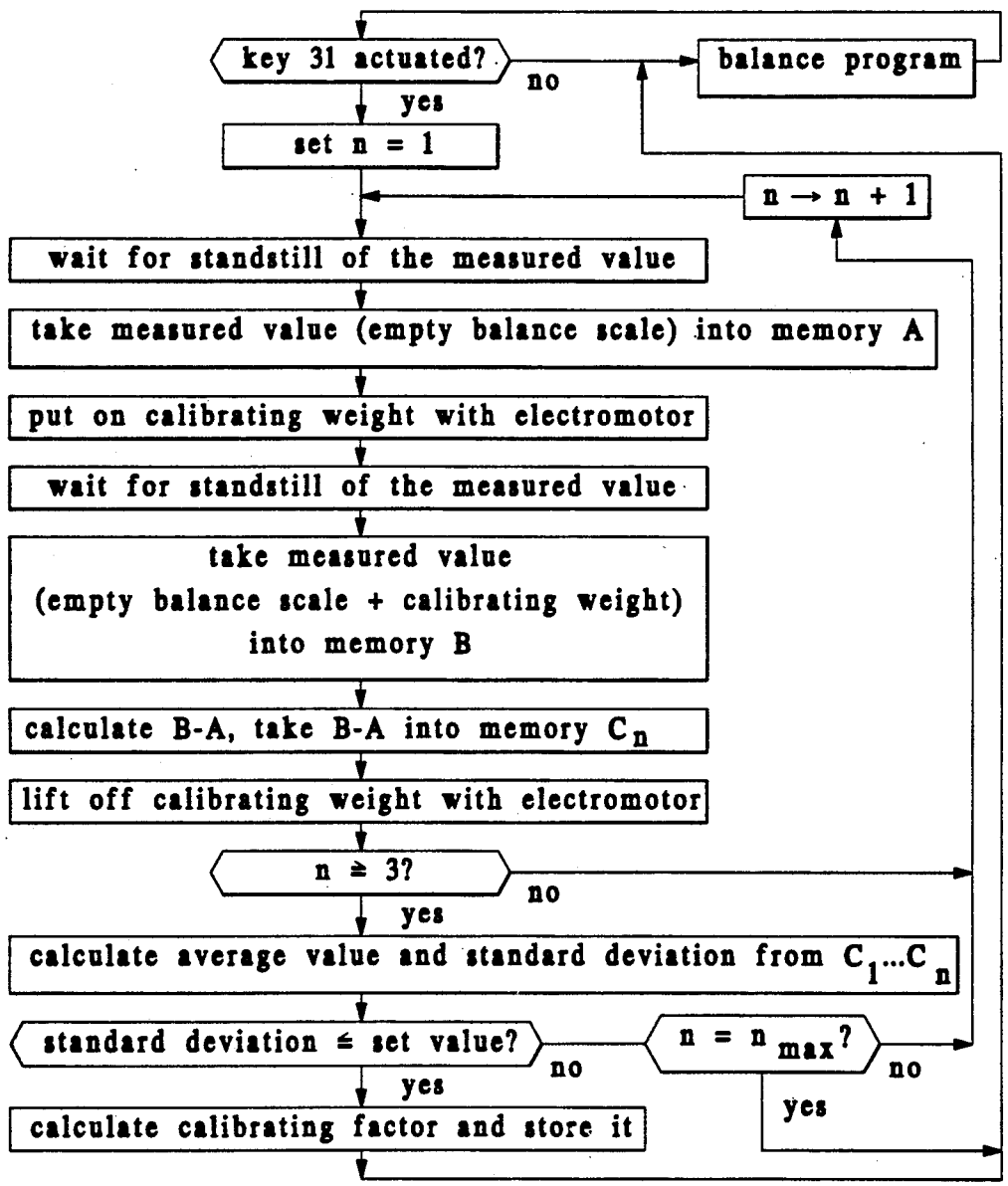
FIG. 5 is a flow chart of the calibrating process according to the invention.

FIG. 4 shows the display unit 219 of a third embodiment of the balance. The mechanical and electronic part of the balance again corresponds to the first embodiment according to FIG. 1. An alphanumeric display field 61 is provided in FIG. 4 above display 60 for the weighing result in which field 61 both the abbreviation "Cal" as well as two values for the standard deviation can be displayed. The lower value, designated with "Ist", is the standard deviation continuously calculated during the calibrating process and the upper value, designated with "Soll" is the standard deviation which is stored as theoretical value in the memory in digital signal processing unit 18. In this manner, the operator can compare the instantaneous standard deviation with the desired value and therewith the instantaneously achieved exactitude with the desired value and therewith the instantaneously achieved exactitude with the theoretical exactitude. The operator can then, for example, wait until the calibrating weight has been placed on and lifted off again so frequently that the instantaneous standard deviation is equal to the desired standard deviation and the automated mechanism concludes the calibrating process. However, one can also conclude the calibrating process prematurely, either with storage of the new calibrating factor if the greater standard deviation is sufficient at the moment, or without storage of a new calibrating factor if one recognizes that under the given ambient conditions the "Ist" value of the standard deviation will no longer achieve the theoretical value or will only achieve it after too long a time.

It is naturally also possible in further embodiments to also display the calculated average value of the mass of the calibrating weight or the calibrating factor or the deviation of the average value from the previously stored calibrating factor.

We claim:

1. An electronic balance comprising
   a measured value receiver,
   a digital signal processing unit,
   a display unit and
   a calibrating device controlled by the digital signal processing unit for placing on and lifting off a calibrating weight by means of a motor,
   the digital signal processing unit that
     allows continuously the placing on and lifting off again of the calibrating weight and
     calculates a calculated average value and a calculated standard deviation from individual measured values,
     compares the calculated standard deviation continuously with a set value stored in the digital signal processing unit and
     stops the placing on and lifting off of the calibrating weight and calculates a calibrating factor from the calculated average value and stores the factor when the calculated standard deviation is smaller than the set value and
   the digital signal processing unit also stops the placing on and lifting off of the calibrating weight after a set maximum time if the calculated standard deviation is not smaller than the set value and does not store a new calibrating factor in this instance.

2. The electronic balance according to claim 1, wherein
   a calculated value of standard deviation is displayed in the display unit and
   at least one actuation key is present on the electronic balance with which an operator of the balance can stop the placing on and lifting off of the calibrating weight.

3. The electronic balance according to claim 2, wherein
   each of two actuation keys are present on the balance with which the operator can stop the placing on and lifting off the calibrating weight and can declare the performed calibration measurement to be valid or invalid.

4. The electronic balance according to claim 3, wherein
   both the calculated standard deviation most recently calculated as well as a theoretical value stored in the digital signal processing unit are displayed in the display unit.

* * * * *